United States Patent
Nagae

(10) Patent No.: US 10,225,889 B2
(45) Date of Patent: Mar. 5, 2019

(54) WINDSHIELD HEATING DEVICE

(71) Applicant: Toyota Jidosha Kabushiki Kaisha, Toyota-shi, Aichi-ken (JP)

(72) Inventor: Hajime Nagae, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 169 days.

(21) Appl. No.: 15/583,199

(22) Filed: May 1, 2017

(65) Prior Publication Data

US 2017/0347405 A1    Nov. 30, 2017

(30) Foreign Application Priority Data

May 31, 2016  (JP) .................. 2016-108851

(51) Int. Cl.
  *H05B 3/86* (2006.01)
  *B60S 1/02* (2006.01)
  *H05B 3/84* (2006.01)

(52) U.S. Cl.
  CPC ............. *H05B 3/86* (2013.01); *B60S 1/026* (2013.01); *H05B 3/84* (2013.01); *H05B 2203/031* (2013.01)

(58) Field of Classification Search
  CPC . B60S 1/023; B60S 1/026; H05B 3/86; H05B 3/84; H05B 3/845; H05B 2203/031
  See application file for complete search history.

(56) References Cited

U.S. PATENT DOCUMENTS

| 10,098,186 | B2 * | 10/2018 | Goutiere et al. | H05B 3/12 |
| 2013/0314540 | A1 | 11/2013 | Hacker et al. | |
| 2018/0213610 | A1 * | 7/2018 | Futatsugi | B60S 1/0848 |

FOREIGN PATENT DOCUMENTS

EP    2644005 B1    9/2014

* cited by examiner

*Primary Examiner* — Kevin Lee
(74) *Attorney, Agent, or Firm* — Dinsmore & Shohl LLP

(57) ABSTRACT

A windshield heating device includes: a heating wire that heats a first part of a windshield of a vehicle, the first part being located in front of a camera; a glass heating apparatus that heats a second part of the windshield, the second part including the first part; and a control unit that controls energization to the heating wire and the glass heating apparatus. The control unit is configured: to determine whether energization to the glass heating apparatus is performed when heating of the first part is requested; to control so that energization to the heating wire is performed when it is determined that the energization to glass heating apparatus is not performed; and to control energization to the heating wire so that an amount of energization to the heating wire is reduced when it is determined that energization to the glass heating apparatus is performed.

5 Claims, 4 Drawing Sheets

WINDSHIELD HEATING DEVICE

CROSS-REFERENCE TO RELATED APPLICATIONS

The present disclosure claims priority to Japanese Patent Application No. 2016-108851 filed on May 31, 2016 which is incorporated herein by reference in its entirety including the specification, drawings and abstract.

BACKGROUND

1. Technical Field

The present disclosure relates to a windshield heating device.

2. Description of Related Art

In the related art, a vehicle equipped with a camera for a preventive safety system is provided with a heating device (hereinafter called a "device in the related art") for preventing windshield fogging in a part of a windshield (for example, a front windshield or a rear windshield) in front of the camera.

The device in the related art described above is provided with a heating wire (hereinafter called a "camera heating wire") for warming a portion of a windshield in front of the camera. This electric heating wire is energized when a request to energize this heating wire is received (for example, see EP Patent Application No. 2644005).

SUMMARY

On the other hand, a windshield heating device (called a "entire-windshield deicer") is known that is equipped with a heating wire, which is buried over the entire (or a major part) surface of a windshield to heat the entire (or the major part) windshield (for example, front windshield or rear windshield) of a vehicle, and a control unit that controls energization to the heating wire.

However, the device in the related art energizes the camera heating wire regardless of whether or not the entire-windshield deicer is energized (that is, independently of energization to the entire-windshield deicer). As a result, the following problem is generated.

That is, there is a part around the camera with low heat-resistance such as the resin part of a camera bracket or a camera case ("low heat-resistance part around the camera"). This means that, when both the entire-windshield deicer and the camera heating wire are energized, the low heat-resistance part around the camera is excessively heated by heat generated by the energization. As a result, there is a possibility that thermal deterioration (for example, melting) of the low heat-resistance part around the camera occurs.

The present disclosure provides a windshield heating device that reduces the possibility of causing thermal degradation in the low heat-resistance part around the camera.

A windshield heating device according to an aspect of the present disclosure includes: a heating wire configured to heat a first part of a windshield of a vehicle by generating heat by energization, the first part being located in front of a camera that photographs an outside of the vehicle from an inside of the vehicle through the windshield; a glass heating apparatus configured to heat a second part of the windshield by generating heat by energization, the second part including the first part; and a control unit that is configured to control energization to the heating wire and the glass heating apparatus. The control unit is configured: to perform glass heating apparatus energization control when heating of the second part is requested, the glass heating apparatus energization control being performed to control energization to the glass heating apparatus so that the glass heating apparatus heats the second part of the windshield; to determine whether the glass heating apparatus energization control is performed when heating of the first part is requested; to control energization to the heating wire so that the heating wire heats the first part when it is determined that the glass heating apparatus energization control is not performed; and to control energization to the heating wire so that an amount of energization to the heating wire is reduced when it is determined that the glass heating apparatus energization control is performed.

According to the aspect described above, energization to the heating wire (camera heating wire) is stopped while the glass heating apparatus is energized. Therefore, there is a low possibility that the temperature of the low heat-resistance part around the camera will become excessively high. As a result, this windshield heating device reduces the possibility of causing thermal deterioration in the low heat-resistance part around the camera.

In the above aspect, the heating wire may be installed on a support member in such a manner that a closed space between the camera and the windshield formed by the support member is heated, the support member being provided to support the camera in the vehicle.

According to the aspect described above, since the space between the camera and the windshield is a closed space, the temperature of the space is easily raised only by the heating wire energization control that is performed while energization to the glass heading apparatus is stopped. Therefore, this windshield heating device easily eliminates fog formed in a part of the windshield in front of the camera and, at the same time, easily prevents fog from being formed in that part.

In the above aspect, the second part may cover the first part and a center of the windshield.

In the above aspect, the second part may be an entire surface of the windshield.

In the above aspect, the control unit may maintain the heating wire in an de-energized state when the heating of the first part is requested and it is determined that the glass heating apparatus energization control is performed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A windshield heating device according to an embodiment of the present disclosure is described below with reference to the drawings. The heating device according to the present embodiment is applied to a vehicle 100 shown in FIG. 1A and FIG. 1B.

Figure 1A:
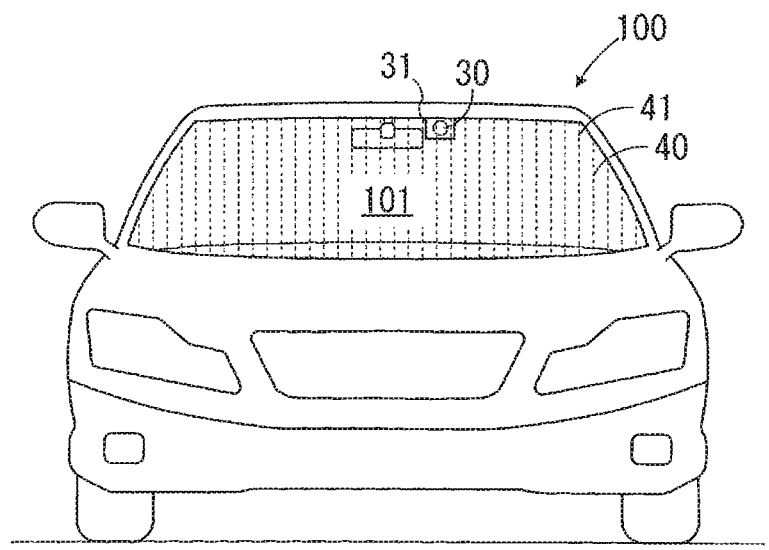
FIG. 1A is a front view of a vehicle having a camera heater (windshield heating device) according to an embodiment of the present disclosure.
Figure 1B:
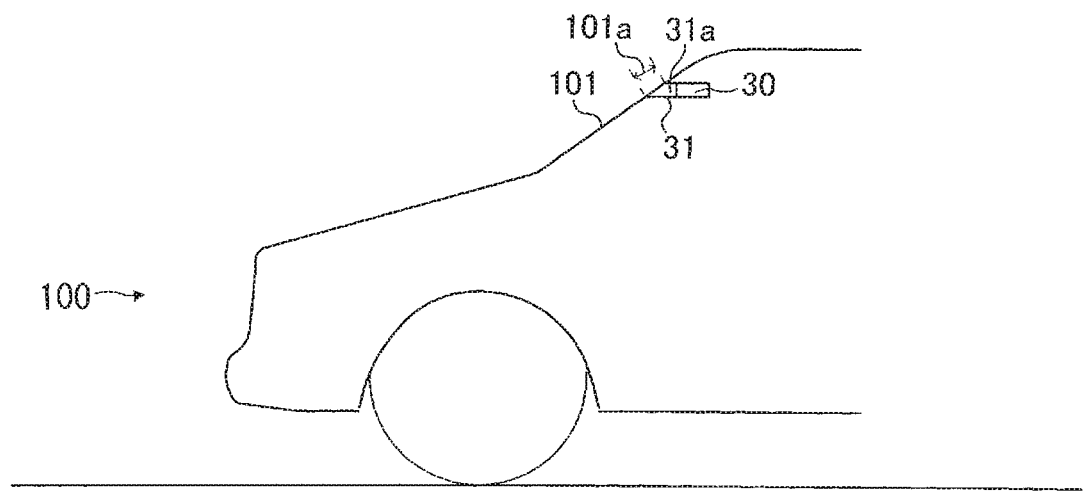
FIG. 1B is a partial side view of the vehicle shown in FIG. 1A.
Figure 2:
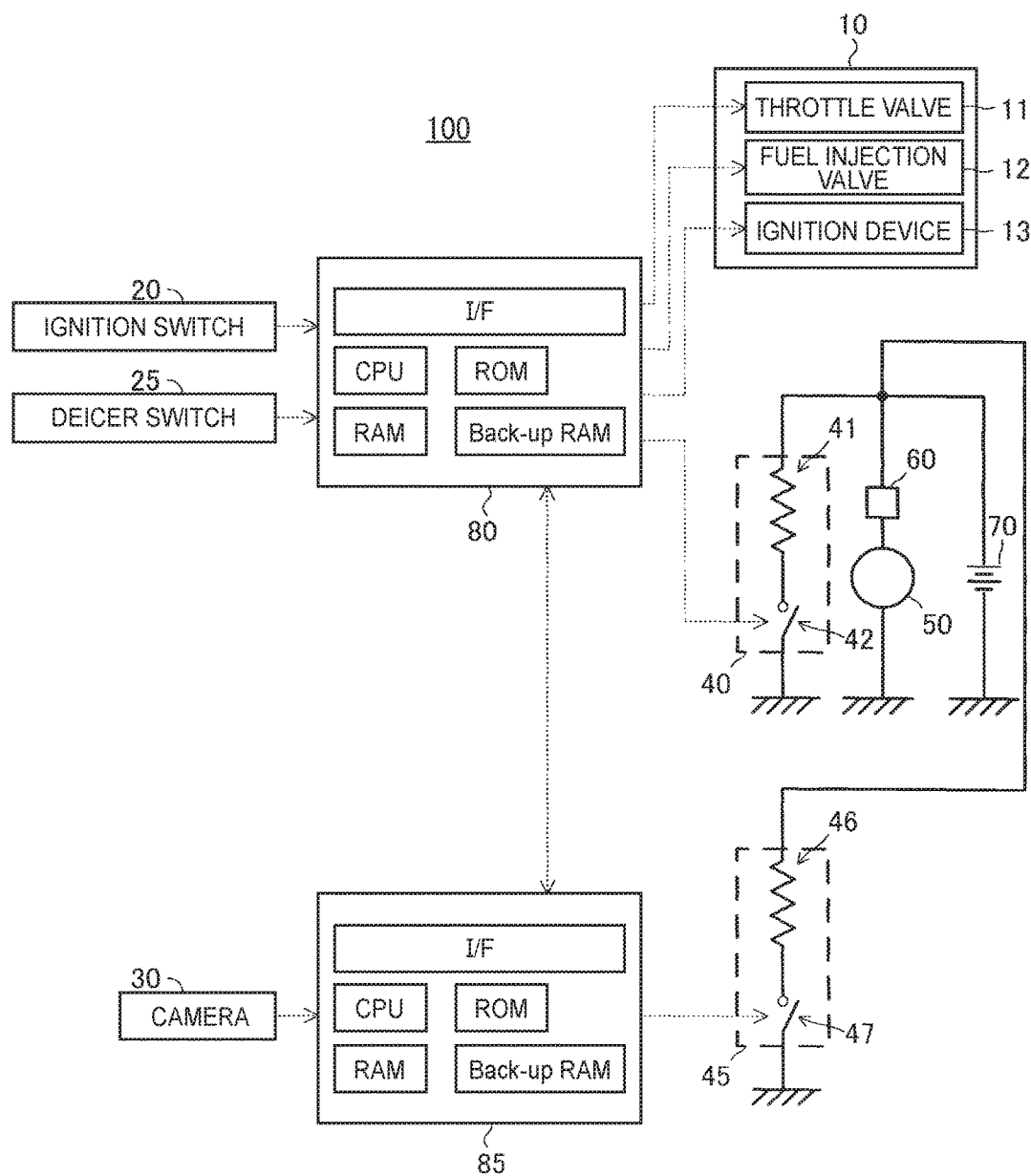
FIG. 2 is a diagram showing a system including the camera heater shown in FIG. 1.

As shown in FIGS. 1A, 1B, and 2, the vehicle 100 includes an internal combustion engine 10, an ignition switch 20, a deicer switch 25, a camera 30, a deicer 40 that works as a windshield heating device, a camera heater 45 that works as a windshield heating device, an alternator 50, a rectifier 60, and a battery 70.

The internal combustion engine 10 (hereinafter simply referred to as "engine 10") is a multi-cylinder (4 cylinders in the example), 4-cycle, spark-ignition-type gasoline engine. As shown in FIG. 2, the engine 10 includes a throttle valve 11, a fuel injection valve 12, and an ignition device 13.

The throttle valve 11 is arranged in an intake pipe (not shown) of the engine 10. The throttle valve 11 is connected to a main electronic control unit (hereinafter referred to as "main ECU") 80 that will be described later. The main ECU 80 drives the throttle valve 11 so that the throttle angle TA of the throttle valve 11 becomes the target value TAtgt.

The fuel injection valve 12 is arranged so that fuel is injected to an intake port (not shown) of the engine 10. The fuel injection valve 12 is connected to the main ECU 80. The main ECU 80 drives the fuel injection valve 12 so that the quantity Q of fuel injected from the fuel injection valve 12 becomes the target value Qtgt.

The ignition device 13 is arranged so that a mixture of fuel and air, formed in a combustion chamber (not shown) of the engine 10, can be ignited. The ignition device 13 is connected to the main ECU 80. The main ECU 80 drives the ignition device 13 so that the ignition device 13 ignites the air-fuel mixture at a predetermined time.

The ignition switch 20 is operated by a driver (user) of the vehicle 100. The ignition switch 20 is connected to the main ECU 80. When the ignition switch 20 is set to the ON position by the driver while the operation of the engine 10 (engine operation) is stopped, the main ECU 80 starts the engine operation and, as a result, the vehicle 100 becomes enabled to travel. On the other hand, when the ignition switch 20 is set to the OFF position while the engine is operated, the main ECU 80 stops the engine operation and, as a result, the vehicle 100 becomes unable to travel.

As shown in FIGS. 1A and 1B, the camera 30 is arranged in the interior of the vehicle 100, that is, inside a front windshield 101 that is one of the windshields on the front of the vehicle 100. The camera 30 is supported in the vehicle 100 with a bracket (support member) 31. The bracket 31 is made of a resin material.

The camera 30 photographs the outside of the vehicle 100 from the inside of the vehicle 100 through the front windshield 101. As shown in FIG. 2, the camera 30 is connected to a camera electronic control unit (hereinafter referred to as "camera ECU") 85 that will be described later. The data photographed by the camera 30 is sent to the camera ECU 85. The camera ECU 85 sends the received photographed data to the main ECU 80. The main ECU 80 uses the photographed data, received from the camera ECU 85, to perform inter-vehicle distance control for maintaining a distance (inter-vehicle distance) between a different vehicle (preceding vehicle), traveling in front of the vehicle 100, and the vehicle 100 at a predetermined distance, to perform lane keeping control for changing a steering angle of a steering wheel (not shown) so that, by recognizing the white lines, the vehicle 100 does not deviate from a lane in which it is traveling, and to perform collision avoidance control for recognizing an obstacle ahead of the vehicle 100 and for operating a braking device (not shown) in order to prevent the vehicle 100 from colliding with the obstacle.

The camera heater 45 (hereinafter simply referred to as "heater 45") shown in FIG. 2 is arranged on the bracket 31 as shown in FIG. 1B so that a space 31a, surrounded by the bracket 31 in front of the camera 30, can be heated. More specifically, the space 31a is a closed space surrounded by the camera 30, the bracket 31, and the front windshield 101. Therefore, the heater 45 is arranged in a portion of the bracket 31 between the camera 30 and the front windshield 101.

The heater 45 includes a heater heating wire 46 and a heater circuit switch 47. One end of the heater heating wire 46 is connected to one terminal of the alternator 50 via the rectifier 60. The other end of the heater heating wire 46 is connected to one end of the heater circuit switch 47. The other end of the heater circuit switch 47 is grounded. In addition, the heater circuit switch 47 is connected to the camera ECU 85, and its state is set to either the ON (conductive) state or the OFF (non-conductive, cut-off) state by an instruction signal from the camera ECU 85.

The alternator 50 is configured to be rotated by a crankshaft (not shown) of the engine 10. During engine operation, the alternator 50 generates electric power by being driven by the engine 10. The other terminal of the alternator 50 is grounded.

When the heater circuit switch 47 is set to the ON state, at least a part of electric power generated by the alternator 50 is supplied to the heater heating wire 46 via the rectifier 60. That is, the heater heating wire 46 is energized. The remaining electric power is charged to the battery 70 via the rectifier 60, or a part of the remaining electric power is supplied to a heating wire 41 of the deicer 40, which will be described later, via the rectifier 60.

When the heater heating wire 46 is energized, the space 31a is heated by heat generated by the heater heating wire 46. As a result, a portion 101a of the front windshield 101 in front of the camera 30 is heated. This heating eliminates fog when the portion 101a of the front windshield 101 is fogged by moisture, or prevents fog from being formed in the portion 101a when the portion 101a of the front windshield 101 is not fogged.

On the other hand, when the heater circuit switch 47 is set to the OFF state, the electric power generated by the alternator 50 is not supplied to the heater heating wire 46. That is, energization to the heater heating wire 46 is stopped.

The deicer 40 includes the deicer heating wire 41 and a deicer circuit switch 42. As shown in FIG. 1A, the deicer heating wire 41 is buried in the front windshield 101 over its entire surface. As shown in FIG. 2, one end of the deicer heating wire 41 is connected to one terminal of the alternator 50 via the rectifier 60. The other end of the deicer heating wire 41 is connected to one end of the deicer circuit switch 42. The other end of the deicer circuit switch 42 is grounded. In addition, the deicer circuit switch 42 is connected to the main ECU 80, and its state is set to either the ON (conductive) state or the OFF (non-conductive, cut-off) state by an instruction signal from the main ECU 80.

When the deicer switch 25 connected to the main ECU 80 is turned on (pressed) by the driver of the vehicle, the main ECU 80 sets the deicer circuit switch 42 to the ON state. The deicer switch 25 stays in the ON state while pressed by the driver, and automatically returns to the OFF state when released.

When the deicer circuit switch 42 is set to the ON state during an operation of the internal combustion engine 10, at least a part of the power generated by the alternator 50 is supplied to the deicer heating wire 41 via the rectifier 60. That is, the deicer heating wire 41 is energized.

When the deicer heating wire 41 is energized, the entire windshield 101 is heated by the heat generated by the deicer heating wire 41. This heating eliminates fog when the front windshield 101 is fogged by moisture, and prevents fog from being formed on the front windshield 101 when the windshield 101 is not fogged.

On the other hand, when the main ECU 80 sets the deicer circuit switch 42 to the OFF state as will be described later, power is not supplied to the deicer heating wire 41. That is, energization to the deicer heating wire 41 is stopped.

The main electronic control unit (or, main ECU) 80, which works as a control unit, is an electronic circuit including a known microcomputer. The main ECU 80 includes a CPU, a ROM, a RAM, a backup RAM, and an interface. The CPU implements various functions by executing routines (programs, instructions) stored in the ROM.

When the ignition switch 20 is set to the ON position, the main ECU 80 starts the engine operation by driving the throttle valve 11, the fuel injection valve 12 and the ignition device 13 in response to the signal from the ignition switch 20. On the other hand, when the ignition switch 20 is set to the OFF position, the main ECU 80 stops the driving of the throttle valve 11, the fuel injection valve 12 and the ignition device 13 in response to the signal from the ignition switch 20.

As described above, the main ECU 80 sets the deicer circuit switch 42 to either the ON state or the OFF state.

The camera electronic control unit (or, camera ECU) 85, which works as a control unit, is an electronic circuit including a known microcomputer. The camera ECU 85 includes a CPU, a ROM, a RAM, a backup RAM, and an interface. The CPU implements various functions by executing routines (programs, instructions) stored in the ROM.

The camera ECU 85 sets the heater circuit switch 47 to either the ON state or the OFF state. As described above, when the camera ECU 85 sets the heater circuit switch 47 to the ON state during engine operation, the heater heating wire 46 is energized. When the camera ECU 85 sets the heater circuit switch 47 to the OFF state, energization to the heater heating wire 46 is stopped.

<Operation Outline>

When the deicer switch 25 is turned on by the driver of the vehicle 100 to change its state from the OFF state to the ON state, a deicer use request is generated. This deicer use request is a request to heat the entire surface of windshield 101 using the deicer 40. When a deicer use request is generated, the main ECU 80 starts energization to the deicer 40 (continuous energization). That is, the main ECU 80 sets the deicer circuit switch 42 to the ON state continuously. When the deicer circuit switch 42 is set to the ON state continuously in this way, power is supplied to the deicer heating wire 41. That is, the deicer heating wire 41 is energized and, as a result, the front windshield 101 is heated by the deicer heating wire 41. The control performed by the main ECU 80 in this way to adjust energization to the deicer 40 for heating the entire surface of the windshield 101 is called the deicer energization control.

After that, when the elapsed time Td from the time the main ECU 80 started energization to the deicer heating wire 41 reaches the predetermined time Tdth, the main ECU 80 sets the deicer circuit switch 42 to the OFF state. When the deicer circuit switch 42 is set to the OFF state, the power supply to the deicer heating wire 41 is stopped, that is, energization to the deicer heating wire 41, is stopped. This means that the main ECU 80 terminates the deicer energization control.

On the other hand, when the ignition switch 20 is set to the ON position, an energization control request condition is satisfied. As a result, a heating wire use request (camera heating wire use request), which is a request to heat the portion 101a of the windshield 101 using the heater heating wire 46, is generated. If the heating wire use request is satisfied and if the deicer energization control is not being performed, the camera ECU 85 performs energization control of the heater heating wire 46 (hereinafter also referred to as "heating wire energization control"). When performing the heating wire energization control, the camera ECU 85 alternately and repeatedly energizes the heater heating wire 46 over a predetermined energization continuation time Ton and stops energization to the heater heating wire 46 over a predetermined energization stopped time Toff.

The energization continuation time Ton is set to a time long enough to eliminate fog formed in the portion 101a of the front windshield 101 in front of the camera 30 and to prevent fog from being formed in the portion 101a.

The energization stopped time Toff is set to a time long enough to lower the temperature of "the parts of the heater 45 and the parts including the bracket 31 and the windshield 101 around the heater 45 (hereinafter, these parts are collectively referred to as "heated parts")" to a temperature low enough for the temperature of the heated parts not to become excessively high during the energization continuation time Ton.

In this embodiment, the energization stopped time Toff is set equal to the energization continuation time Ton. More specifically, the energization stopped time Toff and the energization continuation time Ton are set to 2 to 3 minutes, respectively.

In addition, when the ignition switch 20 is set to the OFF position and, as a result, the heating wire use request is deactivated (that is, when the energization control request condition is not satisfied), the camera ECU 85 sets the heater circuit switch 47 to the OFF state and maintains the switch in that state to stop the heating wire energization control for heater heating wire 46. When the ignition switch 20 is set to the ON position (that is, when a heating wire use request is generated) but when the deicer energization control is being performed for the deicer 40, the camera ECU sets the heater circuit switch 47 to the OFF state and maintains the switch in that state to stop the heating wire energization control for the heater heating wire 46.

Figure 3A:
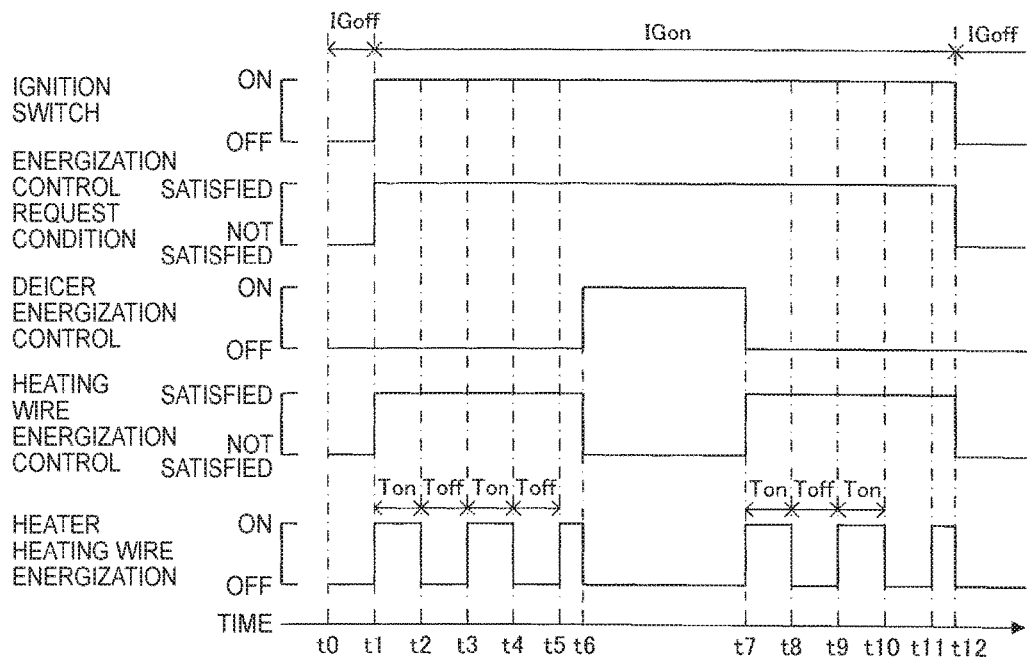
FIG. 3A is a timing diagram showing an operation of the camera heater according to an embodiment of the present disclosure.

More specifically, the deicer energization control and the heating wire energization control described above are performed as follows. For example, when the ignition switch 20 and the deicer switch 25 are operated as shown in FIG. 3A, energization to the heater heating wire 46 is controlled as follows. That is, in the example shown in FIG. 3A, the ignition switch 20 is changed from the OFF position to the ON position at time t1. At time t6, the deicer switch 25 is turned on (pressed) by the driver of the vehicle to start energization to the deicer 40. At time t7 at which the predetermined time Tdh has elapsed from time t6, energization to the deicer 40 is stopped. At time t12, the ignition switch 20 is changed from the ON position to the OFF position.

At time t1 at which the ignition switch 20 is changed from the OFF position to the ON position and, as a result, a heating wire use request is generated, the deicer energization control for the deicer 40 (that is, energization to the deicer 40) is not being performed. Therefore, the camera ECU 85 starts the heating wire energization control for the heater heating wire 46. That is, the camera ECU 85 starts energization to the heater heating wire 46 at time t1 and, at time t2 at which the energization continuation time Ton has elapsed since time t1, stops energization to the heater heating wire 46. The camera ECU 85 resumes energization to the heater heating wire 46 at time t3 at which the energization stopped time Toff has elapsed since time t2.

After that, the camera ECU 85 repeats the operation of energization to the heater heating wire 46 for the energization continuation time Ton and then stopping energization to the heater heating wire 46 for the energization stopped time Toff (see the period from time t2 to time t5).

When the deicer energization control for the deicer 40 is started at time t6, the camera ECU 85 stops the heating wire energization control for the heater heating wire 46. After that, when the deicer energization control (energization to the deicer 40) is ended at time t7, the camera ECU 85 resumes the heating wire energization control for the heater heating wire 46.

After that (that is, after time t7), until time t12 at which the ignition switch 20 is changed from the ON position to the OFF position and, as a result, the heating wire use request is deactivated, the camera ECU 85 alternately and repeatedly energizes the heater heating wire 46 for the energization continuation time Ton and stops energization to the heater heating wire 46 for the energization stopped time Toff. That is, the camera ECU 85 performs the heating wire energization control for the heater heating wire 46 from time t7 to time t12. Then, at time t12, the camera ECU 85 stops the heating wire energization control for the heater heating wire 46. That is, the camera ECU 85 maintains the heater heating wire 46 continuously in the non-energization state.

Figure 3B:
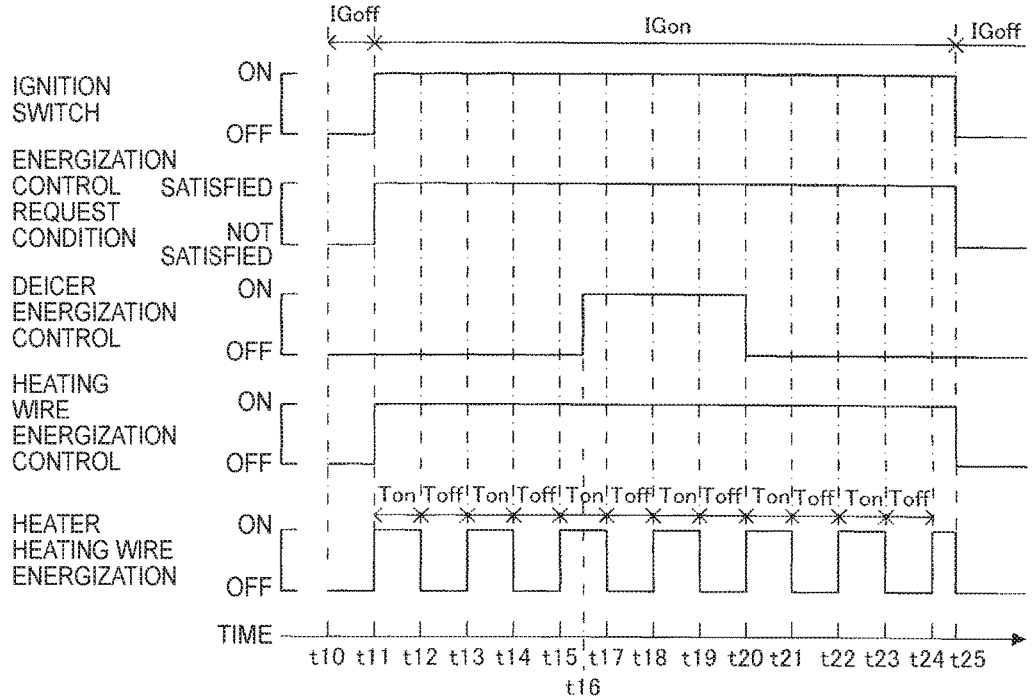
FIG. 3B is a timing diagram showing an operation different from an operation of the camera heater according to an embodiment of the present disclosure.

According to the control for the heater heating wire 46 described above, the possibility of thermal deterioration in the low heat-resistance part around the camera becomes lower than the possibility of thermal deterioration in the low heat-resistance part around the camera that would be caused by the energization control for the heater heating wire 46 shown in FIG. 3B.

That is, in the example shown in FIG. 3B, the heating wire energization control for the heater heating wire 46 is performed also during the period from time t16 at which the deicer energization control for the deicer 40 is started to time t20 at which the deicer energization control is stopped. In this case, the temperature of the low heat-resistance part around the camera is likely to become excessively high due to heating by both the heater heating wire 46 and the deicer heating wire 41. Therefore, there is a high possibility that thermal deterioration will occur in the low heat-resistance part around the camera.

On the other hand, according to the heating device in this embodiment, the heating wire energization control for the heater heating wire 46 is not performed during the period from time t6 at which the deicer energization control for the deicer 40 is started to time t7 at which the deicer energization control is stopped and, during this period, the heating wire 46 is maintained continuously in the non-energized state. Therefore, there is a low possibility that the temperature of the low heat-resistance part around the camera will become excessively high. It is therefore unlikely that thermal deterioration will occur in the low heat-resistance part around the camera.

<Specific Operation>

Figure 4:
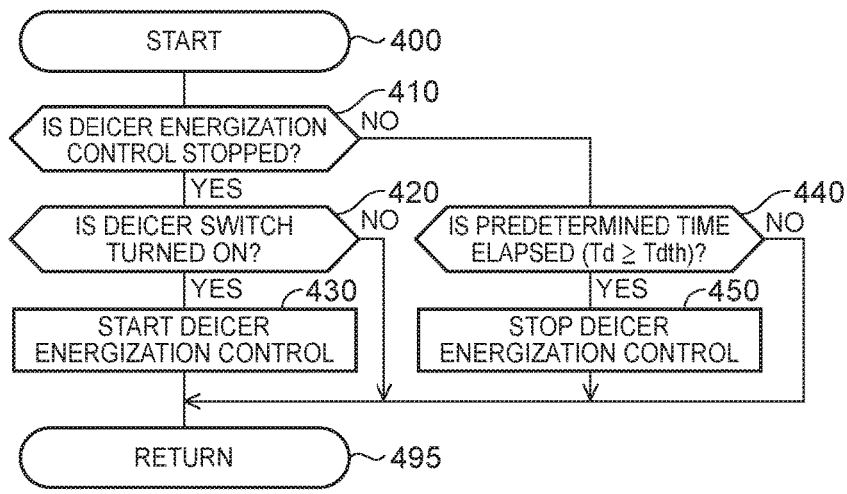
FIG. 4 is a flowchart showing a deicer energization control routine executed by a CPU of a main electronic control unit (main ECU) shown in FIG. 2.

Next, a specific operation of the heating device in this embodiment is described below. The CPU of the main ECU 80 (hereinafter simply referred to as "main CPU") executes the routine, shown by the flowchart in FIG. 4, each time a predetermined time is elapsed. Therefore, when a predetermined time is reached, the main CPU starts processing from step 400 and then the processing proceeds to step 410 to determine whether the deicer energization control for the deicer 40 is being performed (in the flowchart, whether energization to the deicer 40 is stopped).

If the deicer energization control is stopped, the main CPU determines that the result of step 410 is "Yes" and the processing proceeds to step 420 to determine whether the deicer switch 25 is turned on.

If the deicer switch 25 is not turned on (that is, a deicer use request is not generated), the main CPU determines that the result of step 420 is "No" and the processing proceeds directly to step 495 to once end this routine. In this case, since the deicer energization control is maintained in the stopped state, the deicer 40 is placed continuously in the state in which energization to the deicer 40 is stopped.

On the other hand, if the deicer switch 25 is turned on (that is, a deicer use request is generated), the main CPU determines that the result of step 420 is "Yes" and the processing proceeds to step 430. In step 430, the main CPU sets the deicer circuit switch 42 to the ON state to start the deicer energization control (that is, energizes the deicer 40) and then the processing proceeds to step 495 to once end this routine.

If the processing of the main CPU proceeds to step 410 after energization to the deicer 40 is started under the deicer energization control, the main CPU determines that the result of step S410 is "No" and the processing proceeds to step 440 to determine whether the time Td, elapsed after energization to the deicer 40 was started, has reached the predetermined time Tdth.

If the elapsed time Td has not yet reached the predetermined time Tdth, the main CPU determines that the result of step 440 is "No" and the processing proceeds directly to step 495 to once end this routine. In this case, energization to the deicer 40 is continued.

After that, when the time elapses and the elapsed time Td has reached the predetermined time Tdth, the main CPU determines that the result of step 440 is "Yes" and the processing proceeds to step 450 to set the deicer circuit switch 42 to the OFF state for stopping energization to deicer 40. That is, the main CPU ends the deicer energization control, and the processing proceeds to step 495 to once end this routine. In other words, when the deicer 40 is continuously energized for a predetermined time (=Tdth), the deicer use request is deactivated and energization to the deicer 40 is stopped. A specific operation of the main ECU 80 for energization to the deicer 40 is as described above.

Figure 5:
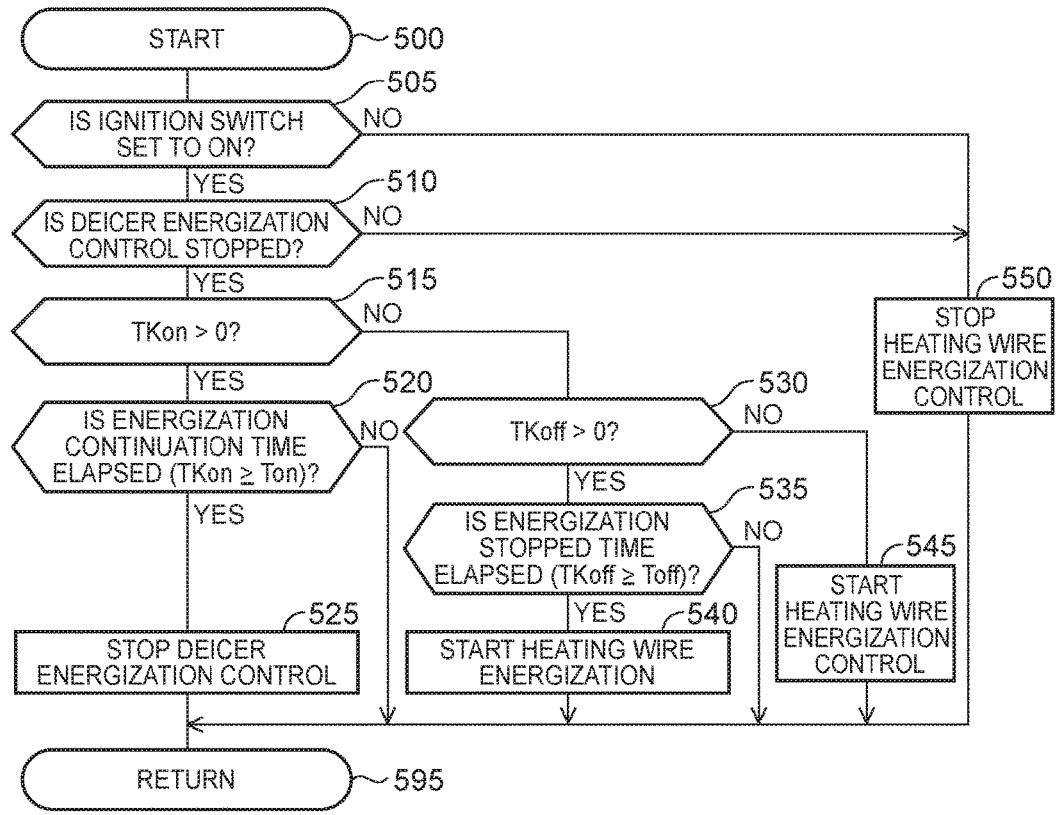
FIG. 5 is a flowchart showing a camera heater energization control routine according to an embodiment executed by a CPU of a camera electronic control unit (camera ECU) shown in FIG. 2.

On the other hand, the CPU of the camera ECU 85 (hereinafter simply referred to as "camera CPU") executes the routine, shown by the flowchart in FIG. 5, each time a predetermined time elapses. Therefore, when a predetermined time is reached, the camera CPU starts processing from step 500 and the processing proceeds to step 505 to determine whether the ignition switch 20 is set to the ON position.

If the ignition switch 20 is set to the ON position and, as a result, the energization control request condition is satisfied (that is, a heating wire use request is generated), the camera CPU determines that the result of step 505 is "Yes" and the processing proceeds to step 510 to determine whether the deicer energization control for the deicer 40 (that is, energization to the deicer 40) is stopped.

If the deicer energization control is not stopped, the camera CPU determines that the result of step 510 is "No" and the processing proceeds to step 550. In step 550, the camera CPU sets the heater circuit switch 47 to the OFF state to stop the heating wire energization control for the heater heating wire 46 (processing for stopping energization to the heater heating wire 46 for continuous time). After that, the processing of the camera CPU proceeds to step 595 to once end this routine. In this case, the heating wire energization control for the heater heating wire 46 is not started, with energization to the heater heating wire 46 maintained in the stopped state.

On the other hand, if the deicer energization control is stopped when the camera CPU executes the processing in step 510 (if energization to the deicer 40 is not being performed), the camera CPU determines that the result of step 510 is "Yes" and executes the processing in step 515 and in the following steps to perform the heating wire energization control for the heater heating wire 46. More specifically, when the processing proceeds to step 515, the camera CPU determines whether the time TKon, elapsed from the time energization to the heater heating wire 46 was started, is greater than zero.

Assume that this point in time is a time immediately after the ignition switch 20 is set to the ON position or that this point in time is a time in a period during which the ignition switch 20 is set to the ON position and is a time immediately after the deicer energization control, which has been performed, is stopped. That is, assume that this point in time is time t1 shown in FIG. 3A or time t7 shown in FIG. 3A.

In this case, since energization to the heater heating wire 46 is not yet started at this point in time, the elapsed time TKon is zero. Therefore, the camera CPU determines that the result of step 515 is "No" and the processing proceeds to step 530 to determine whether the time TKoff, elapsed from the time energization to the heater heating wire 46 was stopped, is greater than zero.

Since this point in time is a time immediately after the ignition switch 20 is set to the ON position or this point in time is a time in a period during which the ignition switch 20 is set to the ON position and is a time immediately after the energization control for the deicer 40, which has been performed, is stopped, the elapsed time TKoff is zero. Therefore, the camera CPU determines that the result of step 530 is "No" and the processing proceeds to step 545 to start energization to the heater heating wire 46. After that, the processing of the CPU proceeds to step 595 to once end this routine.

That is, immediately after the ignition switch 20 is set to the ON position, energization to the heater heating wire 46 is not yet started and the energization state is maintained in the energization stopped state. Similarly, at a time in a period during which the ignition switch 20 is set to the ON position and is a time immediately after the energization control for the deicer, which has been performed, is stopped, energization to the heater heating wire 46 is not yet started and the energization state is maintained in the stopped state. Therefore, at these points in time, both the elapsed time TKon and the elapsed time TKoff are zero. Therefore, the camera CPU determines that the result of step 515 and step 530 is "No", respectively, and the processing proceeds to step 545 to start energization to the heater heating wire 46.

When the camera CPU performs the processing of step 545 to start energization to the heater heating wire 46, the elapsed time TKon becomes larger than zero. Therefore, the next time this routine is executed, the camera CPU determines that the result of step 515 is "Yes" and the processing proceeds to step 520 to determine whether the elapsed time TKon is equal to or larger than the energization continuation time Ton.

Until the elapsed time TKon becomes equal to or larger than the energization continuation time Ton, the camera CPU determines that the result of step 520 is "No" and the processing proceeds directly to step 595 to once end this routine. Therefore, energization to the heater heating wire 46 is continued.

If the elapsed time TKon becomes equal to or larger than the energization continuation time Ton, the camera CPU determines that the result of step 520 is "Yes" and the processing proceeds to step 525 to stop energization to the heater heating wire 46. After that, the processing of the camera CPU proceeds to step 595 to once end this routine.

When the camera CPU performs the processing of step 525 to stop energization to the heater heating wire 46, the elapsed time TKoff becomes larger than zero. On the other hand, the elapsed time TKon is zero. Therefore, the next time this routine is executed, the camera CPU determines that the result of step 515 is "No" and, after that, determines that the result of step 530 is "Yes". Then, the processing proceeds to step 535 to determine whether the elapsed time TKoff is equal to or larger than the energization stopped time Toff.

Until the elapsed time TKoff becomes equal to or larger than the energization stopped time Toff, the camera CPU determines that the result of step 535 is "No" and the processing proceeds directly to step 595 to once end this routine. Therefore, the energization stopped state of the heater heating wire 46 is continued.

If the elapsed time TKoff becomes equal to or larger than the energization stop time Toff, the camera CPU determines that the result of step 535 is "Yes" and the processing proceeds to step 540 to start energization to the heater heating wire 46. After that, the processing of the camera CPU proceeds to step 595 to once end this routine.

If the ignition switch 20 is set to the OFF position when the camera CPU performs the processing of step 505 and, as a result, the energization control request condition is not satisfied (that is, when a heating wire use request is not generated), the camera CPU determines that the result of step 505 is "No" and the processing proceeds to step 550 to stop the heating wire energization control for the heater heating wire 46 (processing for stopping energization to the heater heating wire 46 for continuous time).

A specific operation of the heating device in this embodiment has been described. This heating device eliminates fog in the portion 101a of the front windshield 101 while reducing the possibility of thermal deterioration in the low heat-resistance part around the camera or prevents fog from being formed in the portion 101a of the front windshield 101.

<Modifications>

It should be noted that the present disclosure is not limited to the above embodiment but that various modifications may be used within the scope of the present disclosure.

The energization continuation time Ton and the energization stopped time Toff may be set to the same length of time or may be set to different lengths of time.

When the camera 30 is arranged inside the vehicle 100 so that the outside of the vehicle 100 can be photographed from the inside of the vehicle 100 through a windshield located in the back of the vehicle 100 (rear windshield), the heater 45 may be a heater for heating a part of the rear windshield in front of the camera 30. The vehicle 100 may be equipped with the deicer 40 that heats the entire surface of the rear windshield. In this case, the deicer heating wire 41 is buried inside the rear windshield over the entire surface of the rear windshield.

In addition, when the camera 30 is arranged inside the vehicle 100 so that the outside of the vehicle 100 can be photographed from the inside of the vehicle 100 through the window glass located on the side (side windshield) of the vehicle 100, the heater 45 may be a heater for heating a part of the side window glass in front of the camera 30. The vehicle 100 may be equipped with the deicer 40 that heats the entire surface of the side window glass. In this case, the deicer heating wire 41 is buried inside the side window glass over the entire surface of the side window glass.

The heater 45 may be a heater having a switch that is operated by a user of the vehicle 100. This heater may also be a heater configured to satisfy an energization permission condition and generate a heating wire use request when the switch is set to the ON position by the user of the vehicle 100 and configured not to satisfy an energization permission condition and deactivate a heating wire use request when the switch is set to the OFF position by the user of the vehicle 100.

The vehicle 100 may be a vehicle configured to perform engine operation control to stop the engine operation when a predetermined engine operation stop condition (for example, a condition that the brake pedal is operated and the speed of the vehicle (vehicle speed) has become zero) is satisfied while the engine is operated and to restart the engine operation when a predetermined engine restart condition (for example, a condition that the ignition switch is set to the ON position and the accelerator pedal is operated) is satisfied while the engine operation is stopped. In this case, the heating device according to the present disclosure may be configured to satisfy an energization permission condition and generate a heating wire use request when the engine operation is restarted by the engine operation control and not to satisfy an energization permission condition and deactivate a heating wire use request when the engine operation is stopped by the engine operation control.

In addition, the vehicle 100 may be a vehicle including an internal combustion engine and an electric motor as the driving source of the vehicle (so-called hybrid vehicle) or may be a vehicle having only an electric motor but not having an internal combustion engine as the driving source of the vehicle (so-called electric vehicle). When the vehicle 100 is one of a hybrid vehicle and an electric vehicle, the heating device according to the present disclosure may be configured to generate a heating wire use request when the READY switch, which enables the vehicle to drive (travel), is changed from OFF to ON and to deactivate a heating wire use request when the READY switch is changed from ON to OFF.

In addition, the heating device according to the present disclosure may be configured to determine that a deicer use request is generated when the deicer switch 25 is turned on (pressed) by the driver of the vehicle 100 only in a situation where the outside air temperature or the lubricant temperature of the engine 10 is equal to or lower than a threshold temperature.

In addition, the heating device according to the present disclosure may repeatedly perform deicer energization control in a way similar to that of the heating wire energization control. That is, the heating device according to the present disclosure may perform deicer energization control in such a way that the deicer circuit switch 42 is set to the ON state for a first time T1, which is a fixed time, to energize the deicer heating wire 41 and, after that, the deicer circuit switch 42 is set to the OFF state for a second time T2, which is a fixed time, to de-energize the deicer heating wire 41.

In addition, the deicer heating wire 41 in the heating device according to the present disclosure may be provided, not in the entire windshield surface, but in a part of the windshield including a portion heated by the heater 45. For example, the deicer heating wire 41, when provided to heat the front windshield 101, may be provided to heat a range where the driver's field of view can be secured.

According to the heating device according to the present disclosure, the camera ECU 85 is configured to stop the heating wire energization control for the heater heating wire 46 when the deicer energization control for the deicer 40 is started. Instead of this, the camera ECU 85 may be configured to reduce the heating wire energization amount for the heater heating wire 46 or to reduce the energization continuation time Ton when the deicer energization control for the deicer 40 is started. The camera ECU 85, when configured in this way, reduces heating caused by the heater heating wire 46 and prevents the temperature of the low heat-resistance part around the camera from rising excessively so that the temperature of the portion 101a of the front windshield 101 does not become too high when the deicer energization control for the deicer 40 is started.

What is claimed is:

1. A windshield heating device, comprising:
a heating wire configured to heat a first part of a windshield of a vehicle by generating heat by energization, the first part being located in front of a camera that photographs an outside of the vehicle from an inside of the vehicle through the windshield;
a glass heating apparatus configured to heat a second part of the windshield by generating heat by energization, the second part including the first part; and
a control unit that is configured to control energization to the heating wire and the glass heating apparatus, the control unit being configured
to perform glass heating apparatus energization control when heating of the second part is requested, the glass heating apparatus energization control being performed to control energization to the glass heating apparatus so that the glass heating apparatus heats the second part of the windshield,
to determine whether the glass heating apparatus energization control is performed when heating of the first part is requested,
to control energization to the heating wire so that the heating wire heats the first part when it is determined that the glass heating apparatus energization control is not performed, and
to control energization to the heating wire so that an amount of energization to the heating wire is reduced when it is determined that the glass heating apparatus energization control is performed.

2. The windshield heating device according to claim 1, wherein
the heating wire is installed on a support member in such a manner that a closed space between the camera and the windshield formed by the support member is heated, the support member being provided to support the camera in the vehicle.

3. The windshield heating device according to claim 1, wherein
the second part covers the first part and a center of the windshield.

4. The windshield heating device according to claim 1, wherein
the second part is an entire surface of the windshield.

5. The windshield heating device according to claim 1, wherein
the control unit maintains the heating wire in an de-energized state when the heating of the first part is requested and it is determined that the glass heating apparatus energization control is performed.

* * * * *